United States Patent [19]
Bellanca et al.

[11] Patent Number: 6,032,784
[45] Date of Patent: Mar. 7, 2000

[54] BOOK TURN APPARATUS

[75] Inventors: Joseph V. Bellanca, Sarasota, Fla.; Rodney Michalk, Cedar Park, Tex.

[73] Assignee: Joseph V. Bellanca Revocable Trust, Sarasota, Fla.

[21] Appl. No.: 09/034,573

[22] Filed: Mar. 4, 1998

[51] Int. Cl.[7] .................................................. B65G 47/24
[52] U.S. Cl. .......................... 198/406; 198/407; 412/6; 412/33
[58] Field of Search .................................... 198/406, 407, 198/399; 412/8, 6, 22, 33, 37

[56] References Cited

U.S. PATENT DOCUMENTS

| | | | |
|---|---|---|---|
| 1,449,027 | 3/1923 | Allen | 198/406 |
| 3,494,455 | 2/1970 | Sarring | 198/407 |
| 4,193,489 | 3/1980 | Siniscal | 198/406 |
| 5,108,244 | 4/1992 | Bellanca | 412/37 |
| 5,655,866 | 8/1997 | Bellanca . | |

*Primary Examiner*—William E. Terrell
*Assistant Examiner*—Mark Deuble
*Attorney, Agent, or Firm*—Charles J. Prescott

[57] ABSTRACT

An improved continuous feed book turning apparatus and method for receiving improved book blocks of gathered signatures and for transferring the book blocks into book block clamps ready for edge milling and gluing. The invention takes advantage of efficiency benefits derived from improved signatures as disclosed in U.S. Pat. No. 5,655,866. The improved signatures gathered into book blocks are moved continuously into the apparatus in an upstanding orientation with each longer binding edge upright to substantially increase feed rate. However, the book turning apparatus must rotate each such improved book block through about 90° to present a downwardly facing binding edge for clamping, edge milling, and gluing.

2 Claims, 3 Drawing Sheets

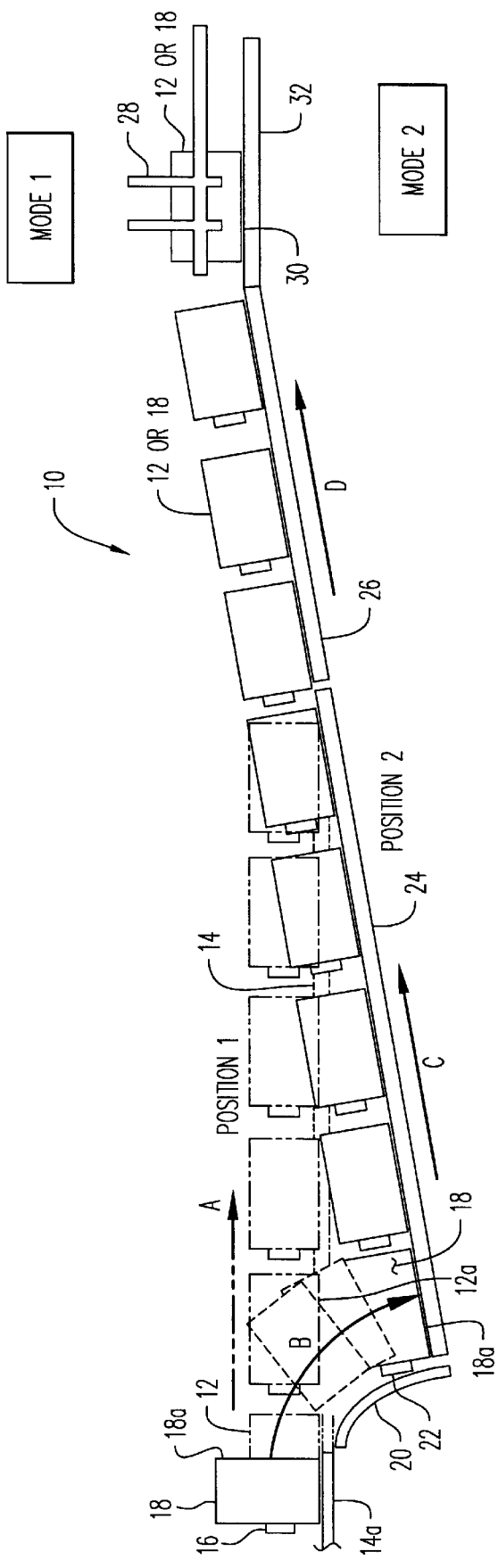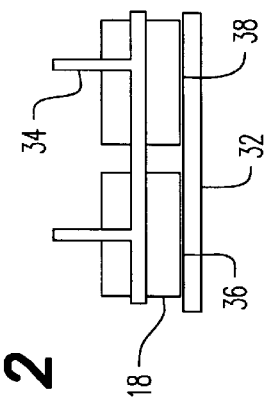

BOOK TURN APPARATUS

BACKGROUND OF THE INVENTION

1. Scope of Invention

This invention relates generally to the field of book binding, and more particularly to an improved book turn apparatus for use in conjunction with an improved signature used in forming book blocks.

2. Prior Art

The making of an improved signature used in book binding is disclosed in prior U.S. Pat. No. 5,655,866 invented by Joseph V. Bellanca, inventor herein. This '866 patent is incorporated herein by reference. In utilizing conventionally folded signatures to form book blocks, no book block turning is required. After being gathered, the book blocks are pushed along by pusher arms in continuous fashion with the binding edge facing downwardly ready for book clamping, edge milling and gluing.

However, the improved signature disclosed in the '866 patent provides an opportunity to gather and move the book blocks in an upright orientation of the binding edge. As described in the '866 patent with respect to FIGS. 9, 10 and 11, significant production rate improvement is realized by this feature of the improved signature.

To take full advantage of the production rate increases derived from the ability to reorient the book blocks in an upright orientation, prior to book block clamping, edge milling and gluing, each of the book blocks must be turned approximately 90° so that the upright binding edge is downwardly facing ready to be received into the book block clamp.

The present invention provides a method of accomplishing this book turning process and describes an improved apparatus for accomplishing same which is adaptable to conventional book block transfer equipment.

BRIEF SUMMARY OF THE INVENTION

This invention is directed to an improved continuous feed book turning apparatus and method for receiving improved book blocks of gathered signatures and for transferring the book blocks into book block clamps ready for edge milling and gluing. The invention takes advantage of efficiency benefits of improved signatures as disclosed in U.S. Pat. No. 5,655,866. The gathered improved signatures, when into book blocks, are moved continuously into the apparatus in an upstanding orientation with the longer binding edge upright to substantially increase feed rate. However, the book turning apparatus must rotate each such improved book block through about 90° to present a downwardly facing binding edge for clamping, edge milling and gluing.

It is therefore an object of this invention to provide a method and continuous feed apparatus for turning book blocks formed of improved signatures which are received into the improved apparatus at a higher feed rate than previously realized.

It is another object of this invention to provide a method of turning book blocks formed of improved signatures which both increase feed rates and reduce the degree of edge milling required prior to gluing.

It is yet another object of this invention to provide an improved apparatus for handling book blocks into book block clamps which are formed of conventionally folded signatures, as well as improved signatures which facilitate upright orientation of the book blocks as they are continuously fed at higher feed rates into the apparatus.

In accordance with these and other objects which will become apparent hereinafter, the instant invention will now be described with reference to the accompanying drawings.

BRIEF DESCRIPTION OF THE DRAWINGS

FIG. 1 is a schematic side elevation view comparing the standard method and apparatus and improved method and modified apparatus for book block transferring into book block clamps.

FIG. 2 is a schematic side elevation view of a double book block clamp facilitated by the present invention for higher production rates.

DETAILED DESCRIPTION OF THE INVENTION

Figure 3:
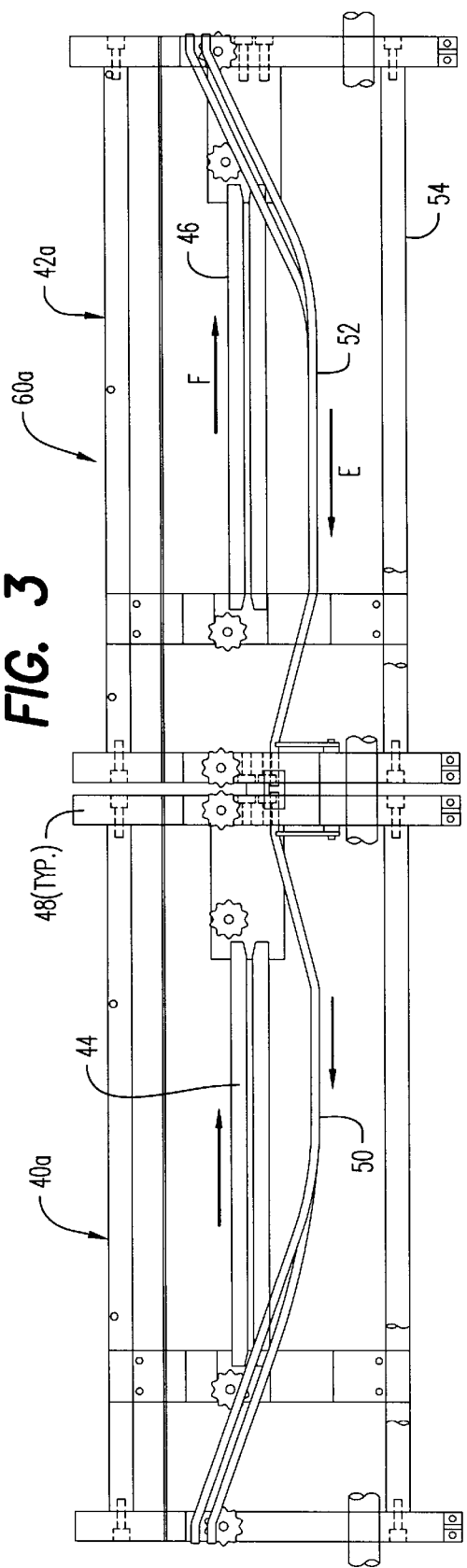
FIG. 3 is a side elevation view of one aspect of an improved book turn apparatus.

Referring now to the drawings, and firstly to FIGS. 1 and 2, a schematic view of the invention is shown generally at numeral 10. The invention 10 represents a method and apparatus for receiving gathered conventional or improved book blocks 12 or 18 at inlet ramp 14a. The improved apparatus 10 is preferably fabricated from a conventional book block transferring and clamping apparatus retrofitted to existing machines. Such a transfer and book block clamping machine sits in seriatim downstream from a signature gathering apparatus.

As shown in phantom in FIG. 1, conventional book blocks 12 are moved in the direction of arrow A on a horizontal support surface 14 by endless chain-driven pusher pins 16. The conventional book blocks 12 are received into the apparatus 10 in horizontal fashion with the binding edge 12a already facing downwardly atop the horizontal surface 14. They are moved by pusher pins 16 horizontally on the final ramp 26 in the direction of arrow D into a book block clamp 28 resting atop surface 32. After being clamped, an edge mill removes the binding edge at 30, after which suitable adhesive is applied and allowed to dry.

This apparatus 10 has also been modified to take advantage of and receive book block 18 which has been produced from folded signatures describing U.S. Pat. No. 5,655,866, the entire disclosure of which is incorporated herein by reference. These improved book blocks 18 formed of improved gathered signatures are received into the apparatus 10 on inlet surface 14a in upright orientation. In this orientation, the leading upright edge 18a is the binding edge. Because the book clamp portion of the apparatus 10 is arranged to edge mill the binding edge 18a while in the downwardly facing horizontal position at 30 previously described, each of the incoming improved book blocks 18 must now be rotated through approximately 90° to place the binding edge 18a downwardly.

The benefit derived from the improved book blocks 18 is as described in the '866 patent wherein significant feed rate efficiencies are achieved by having the improved book blocks 18 in the upright orientation. Feed rates may be nearly doubled utilizing existing book binding equipment.

However, to accommodate the higher feed rates of the improved upright book blocks 18, rotation of the improved book blocks 18 must be accomplished in continuous fashion. A false bottom ramp 20 shown schematically in FIG. 1 is added to the conventional book block transfer apparatus 10. The false bottom ramp 20 is generally arcuately shaped and downwardly oriented so that each book block 18, being pushed by pusher pins 16, falls and rotates through just less than 90° in the direction of arrow B. The binding edge 18a comes to rest atop an inclined ramp 24 wherein a secondary set of pusher pins 22, newly added to the apparatus 10, continues to move each of the book blocks 18 in the direction of arrow C. These secondary pusher pins 22 merge each of the book blocks 18 onto the existing ramp 26 in the direction of arrow D and into the book block clamp 28 as previously described. Use of this conventional book block clamping mechanism 28 is referred to in the drawing as a Mode 1 operation.

However, in FIG. 2, a Mode 2 clamping arrangement is there shown which is necessary to take advantage of the higher book block feed rate previously described. In Mode 2, each book clamp 32 will clampingly engage two separate improved book blocks 18 held atop surface 32 for edge milling of the binding edges 36 and 38 followed by adhesive application to glue the entire arrangement in place. The Mode 2 operation is facilitated because the improved book blocks 18, including the improved signatures previously described, require significantly less edge milling as compared to conventional book blocks 12 prior to gluing.

Figure 4:
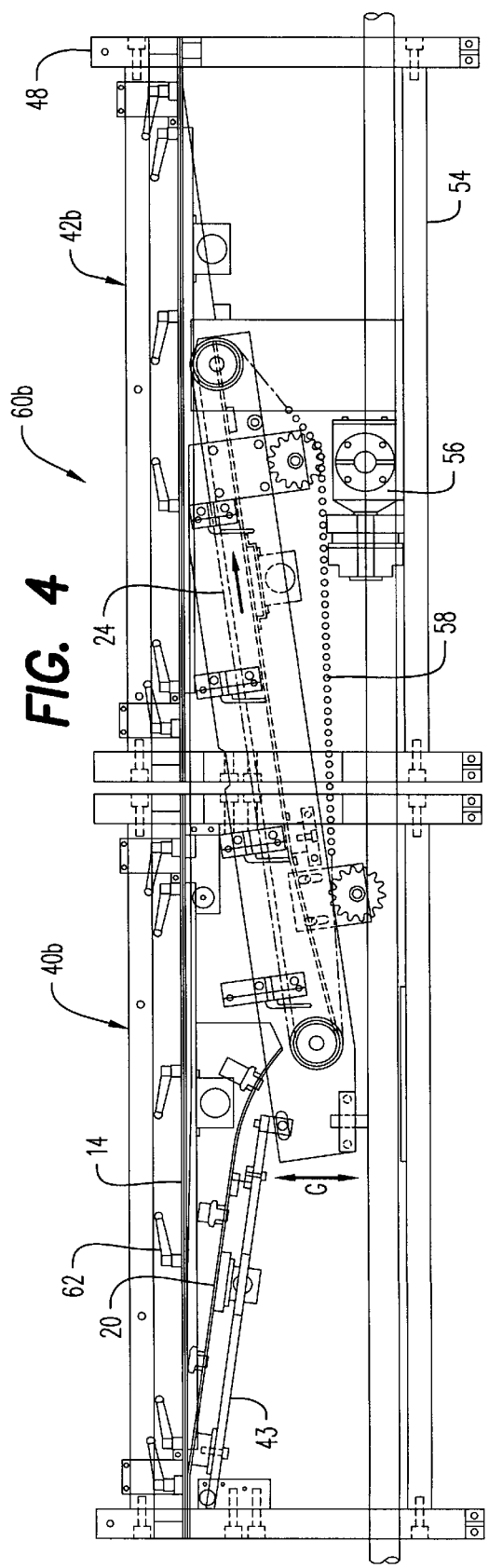
FIG. 4 is a side elevation view of another aspect of the improved book turn apparatus of FIG. 3.
Figure 5:
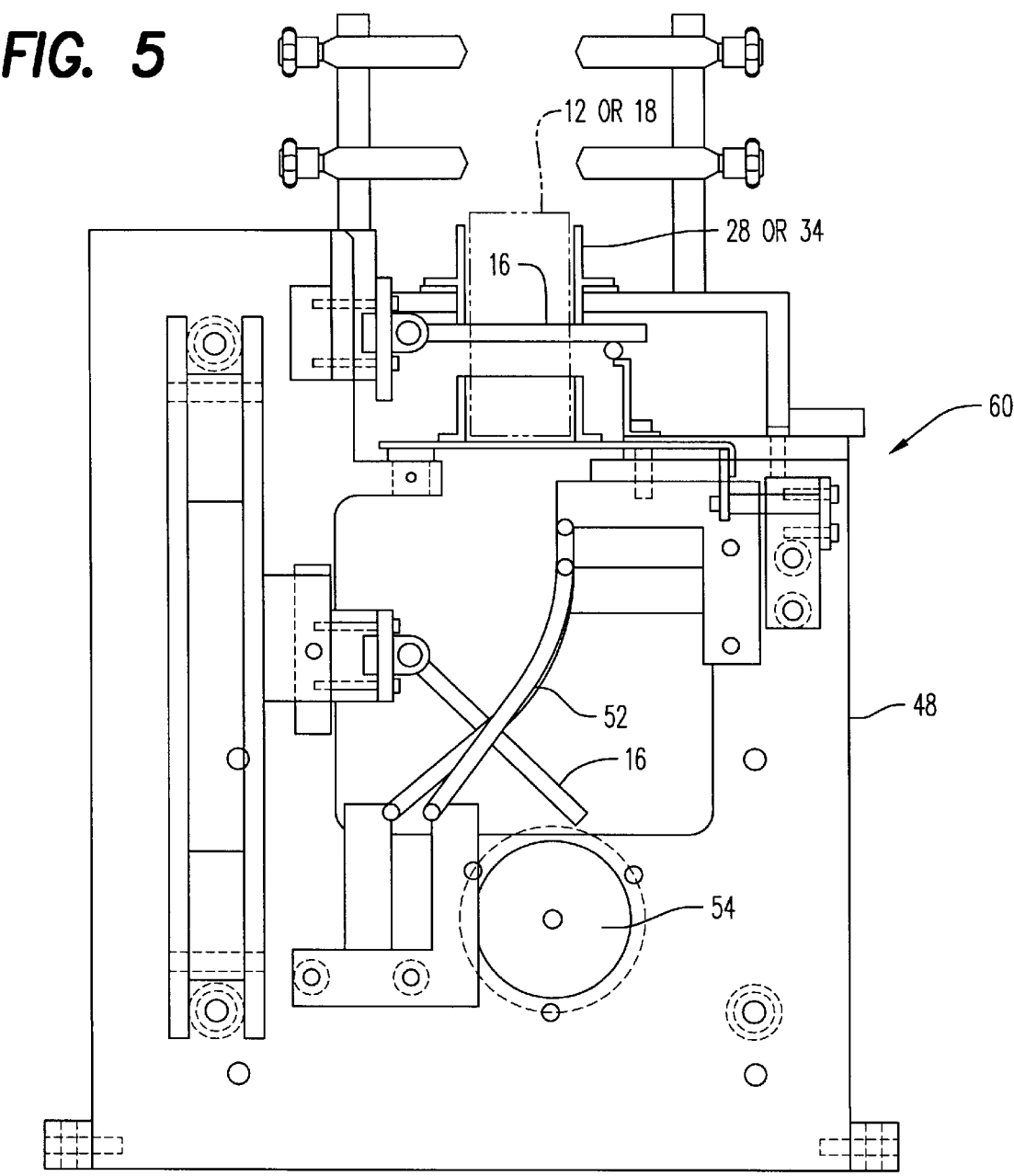

Referring now to FIGS. 3 to 5, an actual book block transfer apparatus in its modified form is there shown in the various figures. FIG. 3 shows one aspect of this improved apparatus at 60a, while FIG. 4 shows another aspect of the apparatus 60b, each aspect representing different vertical views of the apparatus 60 for enhanced clarity and component description.

In FIG. 3, one aspect 60a of the improved apparatus 60, which has been again fabricated to be retrofitted into an existing apparatus, shows the pusher pin guide rail returns 50 and 52 which return the pusher pins (not shown) back into position in the direction of arrow E for book block engagement. Chain guides 44 and 46 are provided which guide the pusher pins in the direction of arrow F to propel each of the book blocks 12 or 18.

The apparatus 60a is fabricated in two sections, 40a and 42a, which are held individually together end-to-end by end plates shown typically at 48. An elongated drive shaft 54 rotatably driven by an electric motor (not shown) drives the endless chain which carries and drives the pusher pins (not shown). In FIG. 4, the improved structure of the apparatus 60b is there shown. Section 40b, conventionally includes the horizontal book block glide surface 14 and adjuster arms 62 for book block alignment and support. This apparatus section 40b also includes the false bottom ramp 20 supported and made adjustable by a support frame 43. The horizontal portion of the false bottom ramp 20 is sloping downwardly generally at about 8° which has been found by experimentation and height adjustment in the direction of arrow G to be most efficient for smooth transitional rotation of each of the book blocks 18 as previously described.

The apparatus 60b of FIG. 4 also includes the modification of the inclined ramp 24 and a secondary drive chain 58 which has been operably drivingly engaged with a power takeoff 56. This power takeoff 56 is gear engaged to drive shaft 54. The secondary drive chain 58 propels the secondary pusher pins (not shown in this view for clarity) to move each of the improved book blocks 18 up the inclined surface 24 and into either mode of the book block ramps 28 or preferably 34 to double up on the book block clamping, edge milling, and adhesion application capacity. Pusher pin return guides 50 and 52 which are arcuately formed spaced apart members as best seen in FIG. 5, control the movement of each of the pusher pins 16 as they reverse direction and move backwardly to pick up another book block 18.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A method of turning book blocks of gathered signatures in a substantially continuous bookbinding process, the signatures being of a uniquely folded type which facilitate receiving the book blocks at the start of said method in an upright orientation of a leading binding edge of each book block, said method comprising the steps of:

A. continuously moving said book blocks which are initially in closely spaced upright edge-to-upright-edge relation along a downward somewhat arcuately formed false bottom ramp whereby each said book block is turned forwardly edgewise through about than 90°;

B. placing each said book block on an upwardly inclined ramp with a leading upright edge thereof facing downward and resting against said inclined ramp;

C. continuously moving said book blocks in closely spaced upper end to lower end relation along said inclined ramp into a book block clamp ready for edge milling of the binding edge and adhesive application thereto.

2. In an apparatus for binding books which receives and transfers incoming book blocks of gathered conventional signatures along a generally horizontal surface on a substantially continuous basis by moving pusher pins into a clamping arrangement in preparation for edge milling and adhesive application, said conventional signatures being oriented with binding edges thereof downwardly facing in supported fashion atop a substantially horizontal transfer surface, the improvement comprising:

a somewhat arcuately shaped false bottom ramp for supportively receiving incoming improved book blocks having gathered signatures of a uniquely folded type which facilitate receiving the improved book blocks in an upright orientation of a leading binding edge of each book block;

said false bottom ramp arcuately shaped to turn or rotate each of the improved book blocks through about 90° to downwardly orient the binding edge of each improved book block while being moved along said false bottom ramp by said pusher pins;

an upwardly inclined ramp extending from said false bottom ramp to, and merging with, said horizontal surface for supportively receiving the binding edge of each of the improved book blocks;

secondary pusher means for moving the improved book blocks along said included ramp to merge onto said horizontal surface, and then to a book block clamp prior to edge milling and adhesive application.

* * * * *